United States Patent

Bürge et al.

[11] Patent Number: 6,149,725
[45] Date of Patent: Nov. 21, 2000

[54] INJECTION CEMENT COMPRISING CORROSION INHIBITORS

[75] Inventors: Theodor A. Bürge, Geroldswil; Franz Wombacher, Oberwil-Lieli, both of Switzerland

[73] Assignee: Sika AG, vorm. Kaspar Winkler & Co., Switzerland

[21] Appl. No.: 09/263,949

[22] Filed: Mar. 8, 1999

[30] Foreign Application Priority Data

Mar. 9, 1998 [CH] Switzerland .............................. 562/98

[51] Int. Cl.⁷ .................................................. C04B 24/12
[52] U.S. Cl. ........................... 106/727; 106/808; 106/823
[58] Field of Search ..................... 106/727, 808, 106/823

[56] References Cited

U.S. PATENT DOCUMENTS

| | | | |
|---|---|---|---|
| 3,443,976 | 5/1969 | Dodson et al. | 106/727 |
| 5,916,483 | 6/1999 | Burge et al. | 106/727 |
| 5,935,318 | 8/1999 | Angelskar et al. | 106/727 |

FOREIGN PATENT DOCUMENTS

| | | |
|---|---|---|
| 247773 | 12/1987 | European Pat. Off. . |
| 6906625 | 11/1970 | Netherlands . |

*Primary Examiner*—Anthony Green
*Attorney, Agent, or Firm*—Burns, Doane, Swecker & Mathis, LLP

[57] ABSTRACT

An injection cement on the basis of micro cement is described that comprises corrosion inhibitors, preferably salt-like products of the neutralisation of amines with acids. Said cement is in particular suitable for the restoration and improvement of the corrosion resistance of buildings comprising fine cracks and cavities laying far below the surface.

14 Claims, 1 Drawing Sheet

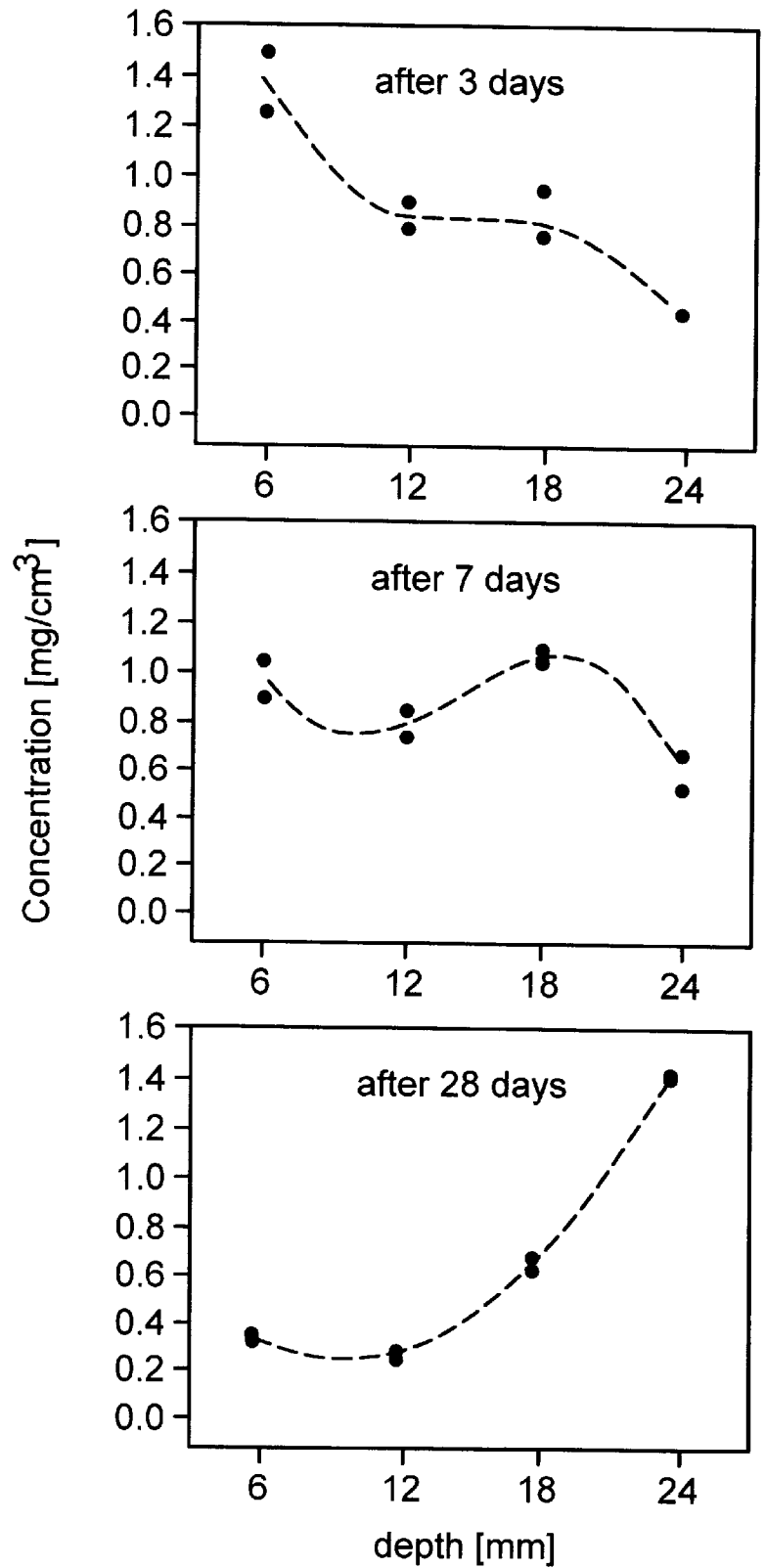
FIGURE

INJECTION CEMENT COMPRISING CORROSION INHIBITORS

This application claims the priority of Swiss patent application 562/98, filed Mar. 9, 1998, the disclosure of which is incorporated herein by reference in its entirety.

TECHNICAL FIELD

The present invention concerns an injection cement that is in particular suitable for the sealing of cracks in concrete and masonry and that at the same time has a corrosion inhibitory effect.

BACKGROUND ART

The use of cement paste for sealing cracks in concrete and in masonry has proved to be suitable for more than 100 years. The broad distribution of the grain sizes of normal cement usually used in cement glue and the dehydration of usual suspensions made of such normal cement, however, limit their application for restoration and repair of concrete masonry. Furthermore, suspensions of normal cement are unsuitable for the stabilisation of grounds with fine grain size. While the high amount of coarse cement grains makes the intrusion of the cement paste into fine cracks and gaps difficult or even impossible, the setting reactions decisive for the strength are disturbed or hindered by the dehydration. The repair of buildings, be it buildings of historic significance, be it buildings constructed some decades ago or only recently, falls within the most important and at the same time most fastidious problems of an injection specialist. In order to enable an improved intrusion into the finest cracks and into cavities being situated deep below the surface, products applicable by injection have been developed. Such injections can either be performed from the surface or by perforated injection hoses already run in the building. In order to get a successful injection, long lasting stable compositions of micro cement with suitable additives are necessary, since only such compositions guarantee the desired consistency of the suspension in the liquid phase. Upon setting, such injection cements are able to form strong connections of the same rigidity as concrete and mortar. Micro cements have a density of about 3.10 g/cm$^3$ and a Blaine value of 8.000 g/cm$^2$ to 20.000 g/cm$^2$.

Typical grain size distributions of a micro cement are:

| | |
|---|---|
| smaller than 2 μm | about 25% |
| smaller than 4 μm | about 32% |
| smaller than 8 μm | about 20% |
| smaller than 16 μm | about 23% |

Typical development of the compressive strength:

| | |
|---|---|
| after 1 day: | about 40 N/mm$^2$ |
| after 2 days: | about 50 N/mm$^2$ |
| after 7 days: | about 60 N/mm$^2$ |
| after 28 days: | about 65 N/mm$^2$ |

Although such injection cements represent a significant progress in comparison with normal cement paste, their application does not enable a sufficient corrosion protection. Of course water penetration to the reinforcements is markedly reduced, however, humidity remaining in the building as well as corrosion promoting substances can still have a detrimental effect on the reinforcements.

EP 0 247 773 discloses the introduction of corrosion inhibitors, for example on a support material in bore holes especially made for said purpose. Said procedure has the disadvantage that on the one hand a mechanical treatment of the building to be restored becomes necessary, on the other hand the corrosion inhibitor is not directly added to the most endangered places due to crack formation.

It is also already known from EP 0 635 463 A1 to add corrosion inhibitors to normal cement used in building construction in order to avoid corrosion of metal reinforcements. However, such cements are not suitable for the repair of buildings due to the above mentioned disadvantages of compositions comprising normal cement which markedly limits their applicability to fill cracks and cavities.

In NL 6 906 625 a covering material is described that comprises a large amount of zinc powder admixed with a binder such as e.g. fine granulated cement. However, such a composition, due to the large amount of zinc and zinc components, is unsuitable for the repair of buildings and furthermore, zinc is an unsuitable corrosion inhibitor for reinforcing irons due to its highly limited migration ability.

SUMMARY OF THE INVENTION

The goal of the present invention therefore was to provide a means for sealing cracks in concrete and masonry, that on the one hand guarantees a good sealing of very fine cracks and of cavities laying far below the surface, and at the same time also provides a long lasting corrosion inhibition.

Said problem was solved by providing an injection cement that besides of micro cement or a mixture of micro cement and portions of hydraulic or latent hydraulic or inert fine material comprises at least one corrosion inhibitor and whereby said corrosion inhibitor comprises an amino compound and/or a hydroxy amino compound.

BRIEF DESCRIPTION OF THE FIGURE

The FIGURE shows the penetration behaviour of a corrosion inhibitor as used according to the present invention.

DETAILED DESCRIPTION OF THE INVENTION

The present invention concerns an injection cement that comprises micro cement and at least one corrosion inhibitor. Besides of micro cement, the binder can be a mixture of micro cement with portions of hydraulic and/or latent hydraulic and/or inert fine material, whereby latent hydraulic or inert fine material is preferred. Specific embodiments can be found in the dependent claims. For the improvement of the pumpability water reducers, high range water reducers or thixotropic agents can be added, for the regulation of the setting time accelerators or retarders and for the reduction of the contraction expansion agents. The injection cement prepared for the specific application of the present invention is an ultra-fine mineralic injection agent in which micro cement is colloidally mixed with water and additives at high speed. Due to its excellent penetration ability said micro suspension is able to intrude the finest pores and defects of a building construction, and to enclose exposed reinforcements thereby protecting them from further corrosion. The corrosion inhibitor that comprises completely or partially neutralised amino compounds and/or amino alcohols, additionally penetrates into the surroundings of the place of injection, covers the reinforcing iron and forms thereon a protective film against renewed corrosion.

The penetration behaviour of a corrosion inhibitor is represented in the FIGURE.

Suitable micro cements include Portland cement, optionally mixed with at least one of a hydraulic compound, a latent hydraulic compound or an inert compound. The injection cement can be produced in that the corrosion inhibitor is admixed prior or after the grinding of the cement or just before the application of the injection cement.

Advantageous corrosion inhibitors of the present invention comprise and preferably are the products of the at least partially performed acid-base neutralisation reaction between amino compounds and acids.

Such corrosion inhibitors can be one amino compound or mixtures of amino compounds, optionally neutralised with one acid or several acids.

Suitable amino compounds and/or amino alcohols are primary and/or secondary and/or tertiary amines, in which aliphatic and/or aromatic and/or cycloaliphatic residues are bound to the nitrogen atom or in which the nitrogen atom of the amino compound is a part of a heterocyclic structure, and whereby in the amino compound of the corrosion inhibitor one or several amino groups are present. Suitable as well are amino alcohols such as primary, secondary or tertiary aliphatic amines that per molecule comprise at least one alcanol amino group.

Especially suitable amino compounds or amino alcohols, respectively, are selected from the group comprising the following amines:

cyclohexylamine dicyclohexylamine

N-methyl cyclohexylamine

N,N-dimethyl cyclohexylamine

N-benzyl dimethylamine hexamethylenetetramine triethylenetetramine diethylenetriamine ethylenediamine N,N-dimethylethanolamine N-methyl-diethanolamine mono-, di-, tri-ethanolamine piperazine morpholine guanidine.

Preferred amino compounds are N,N-dimethylethanolamine, N-methyldiethanolamine as well as mono-, di- and triethanolamine.

Suitable acids for the partial or complete neutralisation by means of acid-base reactions are mono-basic or polybasic inorganic or organic acids, in particular such acids that provide themselves a corrosion reducing effect and/or a water-reducing effect. Especially suitable acids are those that form with calcium ions hardly soluble or insoluble compounds or complexes or chelates. In particular suitable acids are phosphoric acid pyrophosphoric acid phosphonic acids benzoic acid caproic acid caprylic acid enanthic (heptanoic) acid aminobenzoic acid sulfanilic acid salicylic acid sebacic acid oleic acid linoleic acid adipic acid tetrahydroxi adipic acid lactic acid tartaric acid citric acid gluconic acid glucoheptonic acid heptonic acid and ascorbic acid.

Preferred acids are phosphonic acids, benzoic acids, lactic acid, gluconic acid, glucoheptonic acid, enanthic (heptanoic) acid and caprylic acid.

The concentration of amino compound or hydroxy amino compound usually is in the range of 0.2% per weight to 2% per weight, preferably around about 0.6% by weight referred to the weight of the injection cement.

Neither the amines nor their salt-like products with acids affect the stability of the injection cement suspension or its setting behaviour or the final strength of the place to be repaired or the adhesion to the walls of the sealed crack, respectively.

A preferred micro cement is or comprises Portland cement.

Further optionally present additives are setting reducing and/or water reducing and/or thixotropic and/or expansively acting additives. Such additives are known to the skilled person.

Compared to known methods for corrosion inhibition, for example by importing a corrosion inhibitor on a solid support in previously made bore holes, the corrosion inhibiting injection cement of the present invention provides essential advantages. Any mechanic work on or treatment of the building construction can be avoided since the injection cement is directly applied to already present cracks or by means of perforated injection hoses already distributed in the building construction. By the direct injection of the corrosion inhibiting injection cement into cracks, the corrosion inhibitor on the most direct way arrives at the most endangered places and thus develops its primary effect where it is most essential. By the extraordinary good penetration of the corrosion inhibitor at the same time a corrosion protection is also achieved at places relatively far away from such application places.

Besides its use for the restoration of building constructions comprising reinforcing iron, the injection cement according to the present invention is also suitable for the injection into encasing tubes of pre- and/or subsequently stressed concrete. For the restoration of building constructions the injection cement can be applied mixed with water directly or via perforated injection hoses or injection profiles.

EXAMPLE 1

The penetration of the corrosion inhibitor was examined at a cured mortar cube with the dimensions 20×20×12 cm. The mortar composition was

| | |
|---|---|
| CEN sand | 4050 g |
| Portland cement | 1500 g |
| water/cement ratio | 0.49 |

The inhibitor was applied on the mortar surface in pure form. After 3, 7 and 28 days 2 mm holes were drilled and the dust generated from said drilling was examined for the presence of said corrosion inhibitor. The examination was performed at the institute for radio chemistry of the University Heidelberg as well as in the Kernforschungszentrum (Nuclear Research Center) Karlsruhe. As detection method SNMS (Secondary Neutron Mass Spectroscopy) was applied. The penetration depths of the inhibitor after 3, 7 and 28 days is represented in FIG. 1.

By the addition of a corrosion inhibitor to a binder mixture for injection, a further corrosion of the reinforcements in a building construction can be stopped or delayed. The corrosion inhibitor can be premixed with the binder or added directly just prior to the application. Thereby undesired side effects do not occur. The mixing process and the injection method are not complicated and the desired economic aspect is also obtained.

EXAMPLE 2

The influence of the corrosion inhibitor on the workability of the injection cement was examined, in that the flow times in a MARSH funnel were measured after different times with a water content of 65% by weight of cement (bwc) and under addition of 3% of a water reducer bwc without and with 3% bwc aqueous corrosion inhibitor solution (the solution comprised 20% dimethylethanolamine neutralised with lactic acid).

The results are shown in the following table:

| time after mixture in | discharge time in seconds | |
|---|---|---|
| minutes | without inhibitor | with inhibitor |
| 0 | 44 | 45 |
| 60 | 49 | 50 |

The corrosion inhibitor does not change the viscosity of the injection cement slurry.

What is claimed is:

1. An injection cement comprising a micro cement and at least one corrosion inhibitor, wherein said inhibitor comprises an amino compound, a hydroxy amino compound, or a mixture thereof.

2. The injection cement according to claim 1, wherein the micro cement is Portland cement, said Portland cement optionally being mixed with at least one of a hydraulic compound, a latent-hydraulic compound, or an inert compound.

3. The injection cement according to claim 1, wherein said amino compound or hydroxy amino compound is present in an amount from 0.2 to 2% of the total weight of the injection cement.

4. The injection cement according to claim 1, wherein the amino compound or the hydroxy amino compound is a partially or completely neutralized compound.

5. The injection cement according to claim 1, wherein the amino compound, the hydroxy amino compound, or the mixture thereof is selected from the group consisting of: cyclohexylamine, dicyclohexylamine, N-methyl cyclohexylamine, N,N-dimethyl cyclohexylamine, N-benzyl dimethylamine, hexamethylenetetramine, triethylenetetramine, diethylenetriamine, ethylenediamine, N,N-dimethylethanolamine, N-methyl-diethanolamine, mono-, di-, tri-ethanolamine, piperazine, morpholine, and guanidine.

6. The injection cement according to claim 1, wherein the amino compound or hydroxy amino compound is selected from the group consisting of N,N-dimethylethanolamine, N-methyl-diethanolamine, monoethanolamine, di-ethanolamine, and tri-ethanolamine.

7. The injection cement according to claim 4, wherein the amino or hydroxy amino compound has been neutralized with an acid selected from the group consisting of: phosphoric acid, pyrophosphoric acid, phosphonic acid, benzoic acid, caproic acid, caprylic acid, enanthic acid, aminobenzoic acid, sulfanilic acid, salicylic acid, sebacic acid, oleic acid, linoleic acid, adipic acid, tetrahydroxi adipic acid, lactic acid, tartaric acid, citric acid, gluconic acid, glucoheptonic acid, heptonic acid, and ascorbic acid.

8. The injection cement according to claim 4, wherein the amino or hydroxy amino compound has been neutralized with an acid selected from the group consisting of phosphoric acid, benzoic acid, lactic acid, gluconic acid, glucoheptonic acid, enanthic, and caprylic acid.

9. The injection cement according to claim 1, further comprising an additive selected from the group consisting of a setting reducing additive, a water-reducing additive, a thixotropic additive, an expansive additive, and mixtures thereof.

10. The method of injecting cement into a crack in concrete or masonry, comprising mixing an injection cement according to claim 1 with water, and injecting said cement into said crack directly, via a perforated injection hose, or via an injection profile.

11. The method of restoring a building containing iron reinforcements, comprising injecting an injection cement according to claim 1 into a crack in concrete or masonry in said building, wherein injecting said cement is conducted by direct injection, via perforated injection hoses, or via injection profiles.

12. The method of encasing a tube of pre-stressed and/or subsequently stressed concrete, comprising injecting the injection cement of claim 1 into said tube.

13. A method of preparing an injection cement, comprising:

(a) grinding a cement to provide a micro cement and admixing said micro cement with at least one corrosion inhibitor, or (b) admixing a cement and at least one corrosion inhibitor, followed by grinding the cement to provide a micro cement;

said corrosion inhibitor comprising an amino compound or a hydroxy amino compound.

14. The method according to claim 13, wherein said at least one corrosion inhibitor is admixed with said micro cement immediately prior to application of said injection cement to a crack in concrete or masonry.

* * * * *